UNITED STATES PATENT OFFICE.

GEORG WICHMANN AND MAX GABLER, OF BERLIN, GERMANY, ASSIGNORS TO CHEMISCHE FABRIK AUF ACTIEN, (VORM. E. SCHERING,) OF BERLIN, GERMANY.

SALT OF HEXAMETHYLENTETRAMIN AND QUINIC ACID AND PROCESS OF MAKING SAME.

SPECIFICATION forming part of Letters Patent No. 690,804, dated January 7, 1902.

Application filed November 11, 1901. Serial No. 81,926. (No specimens.)

*To all whom it may concern:*

Be it known that we, GEORG WICHMANN and MAX GABLER, subjects of the German Emperor, and residents of Berlin, Germany, have invented a new and useful Improvement in Salt of Hexamethylentetramin and Quinic Acid and Method of Making Same, of which the following is a specification.

This invention relates to the production of the chemical combination or salt of hexamethylentetramin and quinic acid as distinguished from salt-like mixtures of these substances.

By combining hexamethylentetramin and quinic acid a combination or salt is produced which is of great therapeutical value. It has been observed that when this salt is employed a much stronger liberation or separation of formaldehyde takes place in the urinary passages or organs than by the employment of hexamethylentetramin alone. This stronger liberation of formaldehyde cannot be ascribed merely to the fact that the acidity of the urine is increased by quinic acid, because even in cases in which an increase of the acidity of the urine does not occur after taking the salt of hexamethylentetramin and quinic acid an increased liberation of formaldehyde is always observed.

For producing the salt of hexamethylentetramin and quinic acid we proceed as follows: Molecular quantities of quinic acid and hexamethylentetramin are dissolved in alcohol. The solution is then filtered and evaporated *in vacuo.* The salt of hexamethylentetramin and quinic acid separates as a sticky syrup which upon stirring, for instance, with a glass rod produces in a short time beautiful crystals of the salt. The crystals are dried, preferably, *in vacuo.* They break up into small fragments at 105° centigrade and melt slowly between 118° and 125° centigrade. The salt loses the water of crystallization by drying *in vacuo,* and this water is taken up again upon exposure to air. The salt contains about fifty-eight per cent. of quinic acid and forty-two per cent. of hexamethylentetramin. It is insoluble in ether and chloroform, slowly soluble in alcohol, and very easily soluble in water, in which it dissolves more readily than either of the two ingredients. It is impossible to extract the hexamethylentetramin from the salt by chloroform, from which it appears that the hexamethylentetramin is chemically combined with the quinic acid, for the presence of the hexamethylentetramin in the salt is readily established by the liberation or separation of formaldehyde.

We claim as our invention—

1. The herein-described salt of hexamethylentetramin and quinic acid, consisting practically of about fifty-eight per cent. of quinic acid and about forty-two per cent. of hexamethylentetramin, which is a white crystalline body, melting between 118° and 125° centigrade, insoluble in ether and chloroform, slowly soluble in alcohol, and easily soluble in water.

2. The herein-described method of producing the salt of hexamethylentetramin and quinic acid, which consists in dissolving molecular quantities of hexamethylentetramin and quinic acid in a suitable solvent and evaporating the solution, substantially as set forth.

Witness our hands this 26th day of October, 1901.

GEORG WICHMANN.
MAX GABLER.

Witnesses:
WOLDEMAR HAUPT,
HENRY HASPER.